United States Patent
Marchitto et al.

(10) Patent No.: US 9,407,179 B2
(45) Date of Patent: Aug. 2, 2016

(54) CONTROLLER FOR A THREE-PHASE BRUSHLESS D.C. MOTOR

(71) Applicant: Johnson Electric S.A., Murten (CH)

(72) Inventors: Luciano Marchitto, Shatin (HK);
Gianfranco Perna, Shatin (HK);
Pierfranco Pangella, Shatin (HK);
Gianluca Gobbetti, Shatin (HK)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 13/858,698

(22) Filed: Apr. 8, 2013

(65) Prior Publication Data

US 2013/0264979 A1    Oct. 10, 2013

(30) Foreign Application Priority Data

Apr. 10, 2012  (IT) .............................. TO2012A0311

(51) Int. Cl.
| | |
|---|---|
| H02P 6/10 | (2006.01) |
| H02P 6/14 | (2016.01) |
| H02P 6/00 | (2016.01) |
| H02P 6/08 | (2016.01) |

(52) U.S. Cl.
CPC .. *H02P 6/10* (2013.01); *H02P 6/00* (2013.01); *H02P 6/08* (2013.01); *H02P 6/14* (2013.01)

(58) Field of Classification Search
None
See application file for complete search history.

(56) References Cited

U.S. PATENT DOCUMENTS

| | | | | |
|---|---|---|---|---|
| 5,821,708 A | * | 10/1998 | Williams et al. | 318/400.34 |
| 2005/0174076 A1 | * | 8/2005 | Katanaya | H02M 7/53873 318/400.28 |
| 2008/0238349 A1 | * | 10/2008 | Cheng | H02P 6/16 318/400.05 |
| 2010/0188037 A1 | * | 7/2010 | Acquaviva et al. | 318/721 |
| 2010/0237809 A1 | * | 9/2010 | Ogahara | H02P 6/142 318/400.13 |
| 2011/0254489 A1 | * | 10/2011 | Greetham | H02P 6/002 318/400.14 |

FOREIGN PATENT DOCUMENTS

| | | |
|---|---|---|
| EP | 1845609 A2 | 10/2007 |
| IT | EP 1845609 A2 * | 10/2007 ........ H02M 7/53875 |

* cited by examiner

*Primary Examiner* — Eduardo Colon Santana
*Assistant Examiner* — Cortez Cook
(74) *Attorney, Agent, or Firm* — Muncym Geissler, Olds & Lowe, P.C.

(57) ABSTRACT

Controller for a three-phase brushless D.C. motor has a full bridge circuit and an electronic control unit (ECU). The full bridge circuit has three branches each with switches connected to the motor windings. The switches are driven by signals from the ECU. The drive signals are arranged in two sets of three signals. The two sets are offset by 180 electrical degrees. The drive signals of each set are offset by 120 electrical degrees and each have an active portion, alternating with an inactive portion. The active portion includes an initial interval of pulsed activation, an intermediate interval of continuous activation, and a final interval of pulsed activation. The active portion of the drive signals is greater than 120 electrical degrees, with each initial interval of pulsed activation of a switch overlapping the final interval of the previously activated switch.

7 Claims, 5 Drawing Sheets

CONTROLLER FOR A THREE-PHASE BRUSHLESS D.C. MOTOR

CROSS REFERENCE TO RELATED APPLICATIONS

This non-provisional patent application claims priority under 35 U.S.C. §119(a) from Patent Application No. TO2012A000311 filed in Italy on Apr. 10, 2012, the entire contents of which are incorporated herein by reference.

FIELD OF THE INVENTION

This invention relates to a controller for an electric motor and in particular, to a controller for a three-phase brushless D.C. motor.

BACKGROUND OF THE INVENTION

More specifically, the invention proposes a controller for a three-phase brushless motor, comprising: a full bridge circuit, including three circuit branches connected between the two poles of a D.C. voltage supply source, each branch comprising an upper electronic switch and a lower electronic switch, connected with each other and connected to the positive pole and the negative pole, respectively, of said source, each of the windings or phases of the motor being connected to an intermediate point between the two switches of a corresponding branch of the bridge circuit; and an electronic control unit designed to drive, in steady state, the upper switches and the lower switches of the bridge circuit by means of respective sets of three drive signals, said sets of three being offset from each other by about 180 electrical degrees, each set comprising three drive signals offset by about 120 electrical degrees from each other and each comprising an active or conducting portion, alternating with an inactive or cut-off portion; the electronic control unit being designed in such a way that each active portion of each drive signal includes an initial interval of pulsed activation, an intermediate interval of continuous activation, and a final interval of pulsed activation; the intermediate interval of continuous activation having a duration in electrical degrees which is greater than that of each interval of pulsed activation.

A controller of this type is described in EP1845609 A2.

However, controllers of this type tend to produce undesired variations in torque supplied by the motor.

SUMMARY OF THE INVENTION

Hence there is a desire for an improved controller of this type, which can serve to limit the variations of the torque supplied by the motor.

It is preferred that the improved controller can be made by using relatively simple and inexpensive devices.

This is achieved in the present invention by using a controller of the type specified above., in which the aforesaid electronic control unit is designed to drive, in steady state, the switches with drive signals whose active or conducting portion extends over more than 120 electrical degrees, in such a way that each initial interval of pulsed activation of a switch overlaps at least in part the final interval of pulsed activation of the previously activated switch.

Accordingly, in one aspect thereof, the present invention provides a controller for a three-phase brushless D.C. motor, comprising: a full bridge circuit, including three circuit branches connected between the two poles of a D.C. voltage supply source, each branch comprising an upper electronic switch and a lower electronic switch, connected with each other and connected to the positive pole and the negative pole, respectively, of said source; each of the windings or phases of the motor being connected to an intermediate point between the two switches of a corresponding branch of the bridge circuit; and an electronic control unit arranged to drive, in steady state, the upper switches and the lower switches of the bridge circuit by means of respective sets of three drive signals, said sets of three being offset from each other by about 180 electrical degrees, each set comprising three drive signals offset by about 120 electrical degrees from each other and each comprising an active or conducting portion, alternating with an inactive or cut-off portion; the electronic control unit being arranged in such a way that each active portion of each drive signal includes an initial interval of pulsed activation, an intermediate interval of continuous activation, and a final interval of pulsed activation; the intermediate interval of continuous activation having a duration in electrical degrees which is greater than that of each interval of pulsed activation; wherein the electronic control unit is arranged to drive, in steady state, said switches with drive, signals whose active or conducting portion extends over more than 120 electrical degrees, in such a way that each initial interval of pulsed activation of a switch overlaps at least in part the final interval of pulsed activation of the previously activated switch.

Preferably, the electronic control unit is arranged to drive, in steady state, said switches with drive signals whose active or conducting portion extends over approximately 140 electrical degrees at least.

Preferably, the electronic control unit is arranged to drive, in steady state, the switches with drive signals whose active or conducting portion is variable as a function of the speed of the motor and/or the current drawn thereby, in such a way that the torque ripple is reduced.

Preferably, the electronic control unit is arranged to drive, in steady state, said switches with drive signals comprising an initial interval of pulsed activation with pulses having a width (duration) modulated with an increasing average value, and having a final interval of pulsed activation with pulses having a width (duration) which is modulated with a decreasing average value.

Preferably, the width or duration of the pulses of the initial interval and the final interval varies in accordance with a predetermined time profile, in such a way that the torque ripple is reduced.

Preferably, the width or duration of the pulses of the initial interval and the final interval varies as a function of the speed of the motor and/or the current drawn by the motor.

Preferably, each active or conducting portion of each drive signal begins with a predetermined delay with respect to the immediately preceding zero-crossing point of the corresponding back-electromotive force.

The delay may be fixed or variable as a function of the speed of rotation of the motor and/or the current drawn by the motor.

Preferably, the electronic control unit is formed by an 8-bit microcontroller.

Therefore the controller according to the invention can be used to provide a pseudo-sinusoidal current system in a relatively simple manner and at low cost.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
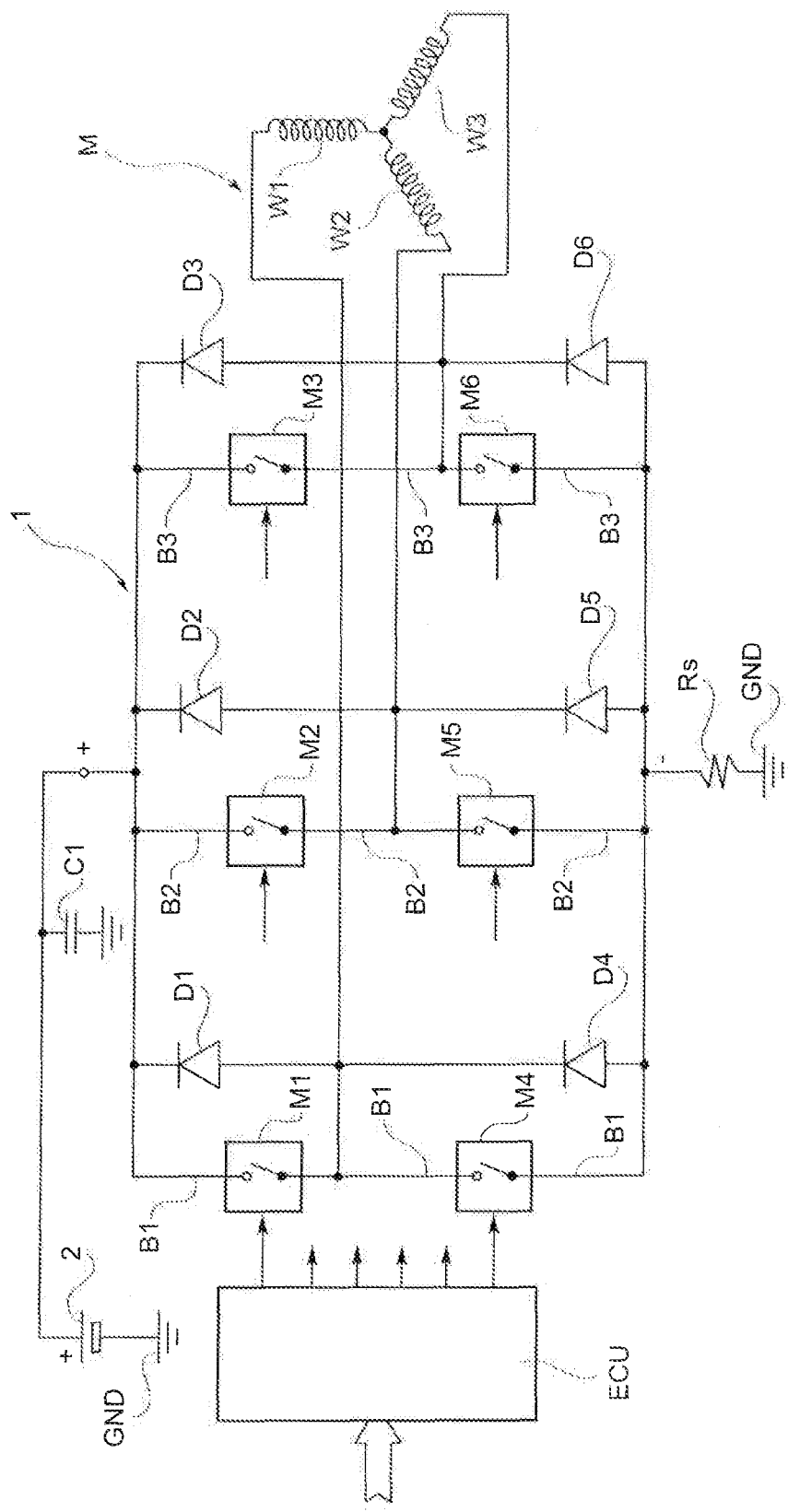
FIG. 1 is a schematic circuit diagram of a controller for a three-phase brushless D.C. motor.

FIG. 1 illustrates the general structure of a controller for a three-phase brushless D.C. motor, according to the present invention. This controller comprises a full bridge circuit 1, including three circuit branches indicated by B1, B2 and B3. These circuit branches are connected between the two poles of a D.C. voltage supply source 2 which, in the illustrated exemplary embodiment, has its negative pole connected to an earth conductor GND.

The branches B1, B2 and B3 of the bridge circuit 1 comprise respective upper electronic switches M1, M2 and M3, and respective lower electronic switches M4, M5 and M6, interconnected in order and connected to the positive pole and the negative pole, respectively, of the source 2.

These electronic switches are preferably transistors of the MOSFET type.

The bridge circuit 1 is connected to a brushless motor M, having three phases or windings W1, W2 and W3, which in the illustrated embodiment are interconnected in a star configuration, but which may alternatively be interconnected in a delta configuration. Each of the windings W1, W2 and W3 is connected to an intermediate point between the two electronic switches of a corresponding branch of the bridge circuit 1.

In a known way, each electronic switch M1-M3, M4-M6 has a respective recirculation diode D1-D3, D4-D6 connected in parallel with it. Additionally, a capacitor C1 is connected, again in a known way, in parallel with the bridge circuit 1. A shunt resistor Rs may be interposed between the lower switches M4, M5 and M6 and the earth GND, for the detection of the level of current flowing in the motor M.

The control (gate) inputs of the switches of the bridge circuit 1 are connected to corresponding outputs of an electronic control unit, indicated as a whole by ECU. This unit may be formed in a simple way using an 8-bit microcontroller; consequently, the use of a DSP (Digital Signal Processor) is not necessary.

The unit ECU is designed to drive the electronic switches of the bridge circuit 1 in predetermined modes, as a function of signals that may be applied from outside, and also as a function of signals generated within the unit if necessary.

The control unit ECU may have, for example, three position sensors, such as Hall effect sensors or others, connected to it for the purpose of detecting the instantaneous position of the rotor of the motor M.

Figure 2:
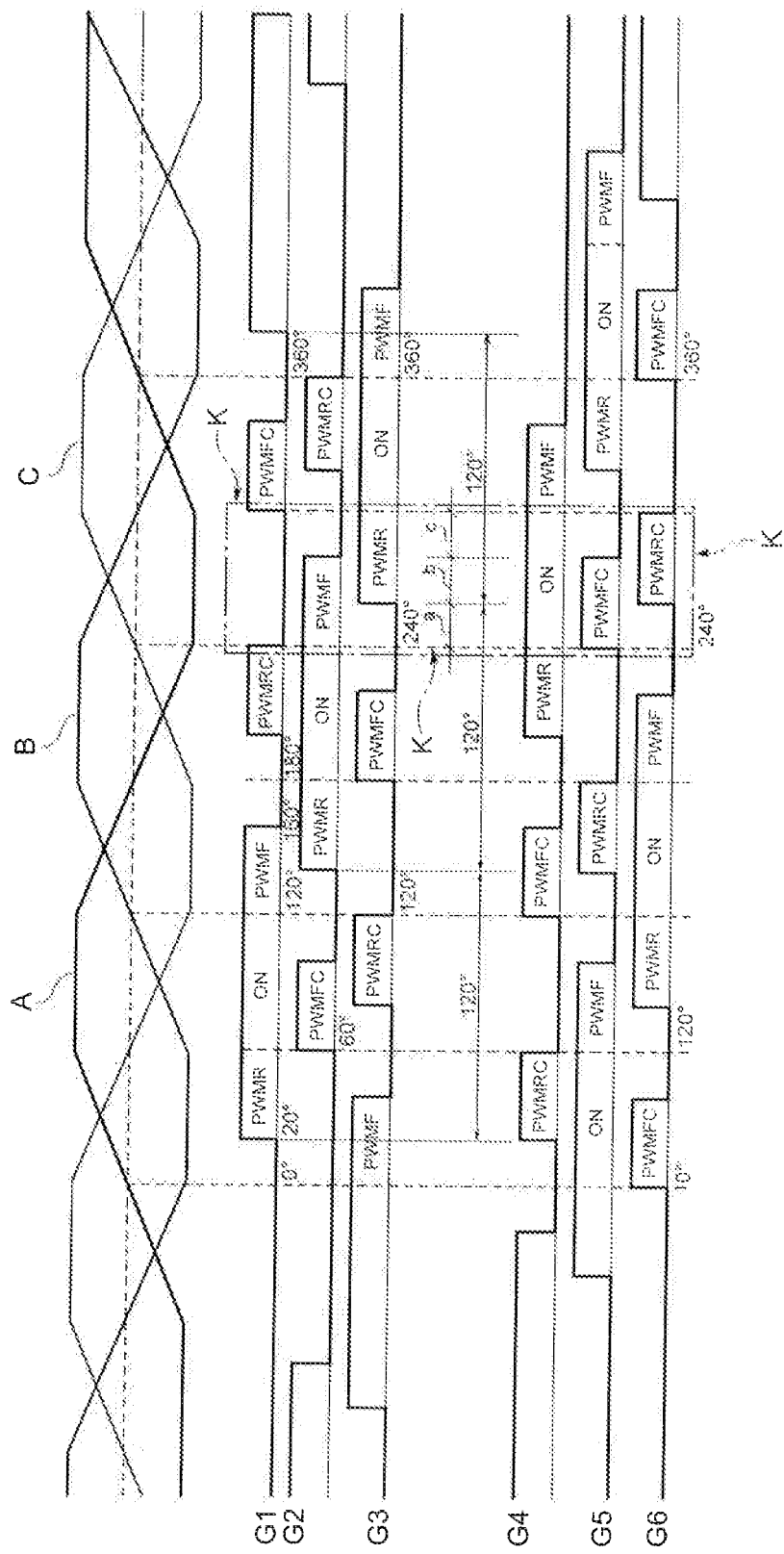
FIG. 2 shows examples of the variation of drive signals according to the present invention for the upper and lower electronic switches of a bridge circuit according to FIG. 1.

Alternatively, the instantaneous position of the rotor of the motor M may be deduced, in a known way, from an analysis of the back-electromotive forces developed in the windings or phases W1, W2 and W3 of the motor M. In FIG. 2, these back-electromotive forces are indicated by A, B and C.

In particular, the control unit ECU is designed to drive, in steady state, the upper switches M1, M2 and M3 and the lower switches M4, M5 and M6 of the bridge circuit 1 by means of respective sets of three drive signals, these sets of three being offset from each other by about 180 electrical degrees, each set comprising three drive signals offset by about 120 electrical degrees from each other and each comprising an active or conducting portion, alternating with an inactive or cut-off portion.

The drive signals applied to the electronic switches of the bridge circuit 1 may be, for example, those whose exemplary variations are represented in a qualitative way in the middle and lower part of FIG. 2.

In this figure, the drive signal applied to the generic i-th (i=1, 2, ... 6) electronic switch Mi of the bridge circuit is indicated by Gi.

The unit ECU may, in particular, be designed so as to generate drive signals such that each active portion of each drive signal G1-G3, G4-G6 (FIG. 2) has an initial interval PWMR of pulsed activation with pulses of modulated width (duration), with an average value which is variable according to a predetermined profile, for example an increasing profile; an intermediate interval ON of continuous activation; and a final interval PWMF of pulsed activation with pulses of modulated width (duration) with an average value which is, for example, decreasing.

For each drive signal Gi, each active portion begins with a predetermined delay (in electrical degrees), which may be fixed or variable, with respect to the immediately preceding zero-crossing point of the corresponding back-electromotive force (A or B or C). In the exemplary diagrams of FIG. 2, this delay is 20 electrical degrees.

In the initial interval PWMR of each active portion of every drive signal Gi, the duty cycle of the pulses may be varied according to a predetermined law or profile, which may be fixed or variable.

Both the aforementioned initial delay and the law or profiles of variation of the duty cycle can be determined so as to provide a reduction in the torque ripple. If a variable delay period is chosen, the profile of variation of the duty cycle can be fixed, and vice versa.

If the initial delay or profile of variation of the duty cycle is not fixed, it can conveniently be varied according to a predetermined function of the measured or deduced speed of rotation of the motor, and/or of the level of current drawn by the motor.

Each intermediate interval ON of continuous activation preferably has a duration in electrical degrees which is greater than that of each interval PWMR or PWMF of pulsed activation.

In total, each active portion of each drive signal has a duration of more than 120 electrical degrees, as is clearly shown in the diagrams in the middle and lower parts of FIG. 2. Consequently, the initial interval PWMR of pulsed activation of a switch overlaps, at least in part, the final interval PWMF of pulsed activation of the immediately preceding activation switch at each change of phase.

Conveniently, the total duration of the active or conducting portion (PWMR +ON+PWMF) of each drive signal is equal to 140 electrical degrees or more. In general, the duration of the active or conducting part of the drive signals may be made variable as a function of the speed of the motor and/or the current drawn by it, particularly in such a way as to reduce the torque ripple. The speed of the motor may be detected by means of a sensor, or deduced, for example, from the variations of the back-electromotive forces A, B and C (FIG. 2).

Conveniently, as shown in the graphs of FIG. 2, in conjunction with the initial interval PWMR of pulsed activation and the final interval PWMF of the active or conducting portion of the drive signal applied to the gate of a switch of the bridge circuit 1, pulsed activation signals PWMRC and PWMFC, complementary to the signals PWMR and PWMF respectively, can be applied to the gate of the switch belonging to the same branch of this bridge circuit.

Figure 3A:
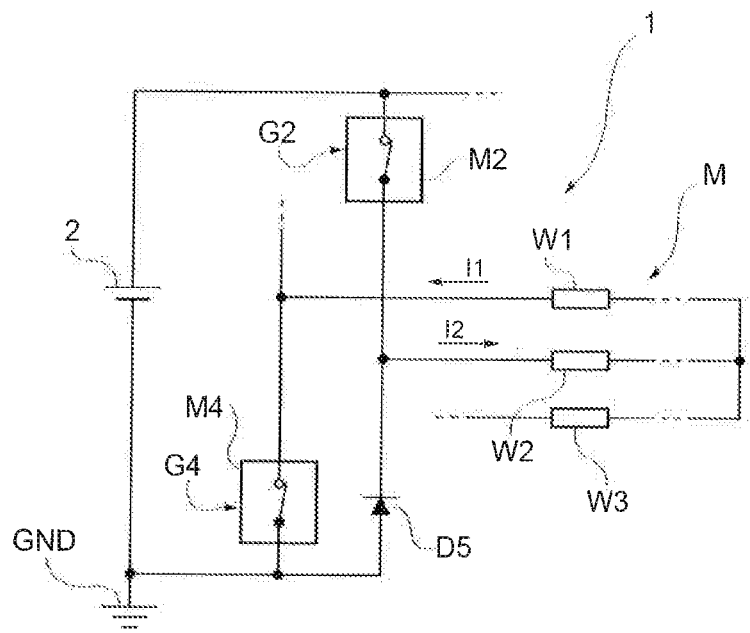
FIGS. 3a to 3c are partial circuit diagrams explaining the operation of the controller according to the present invention.
Figure 3B:
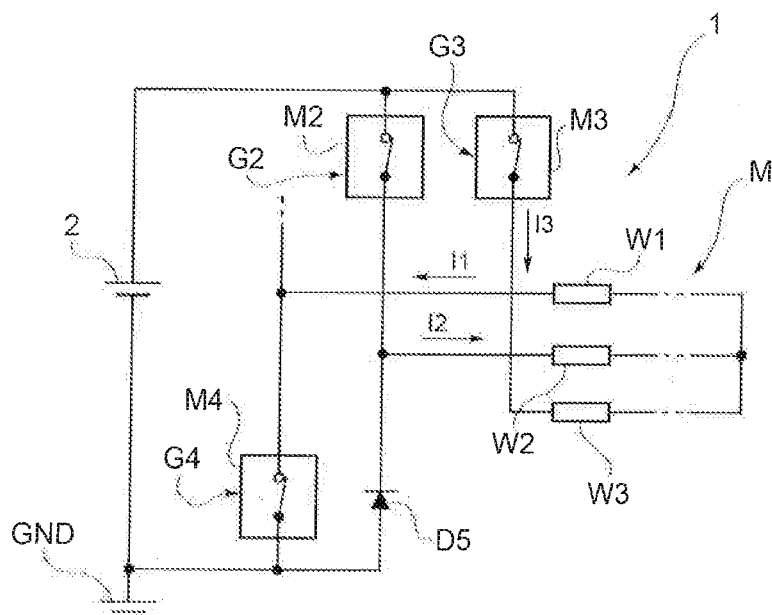
Figure 3C:
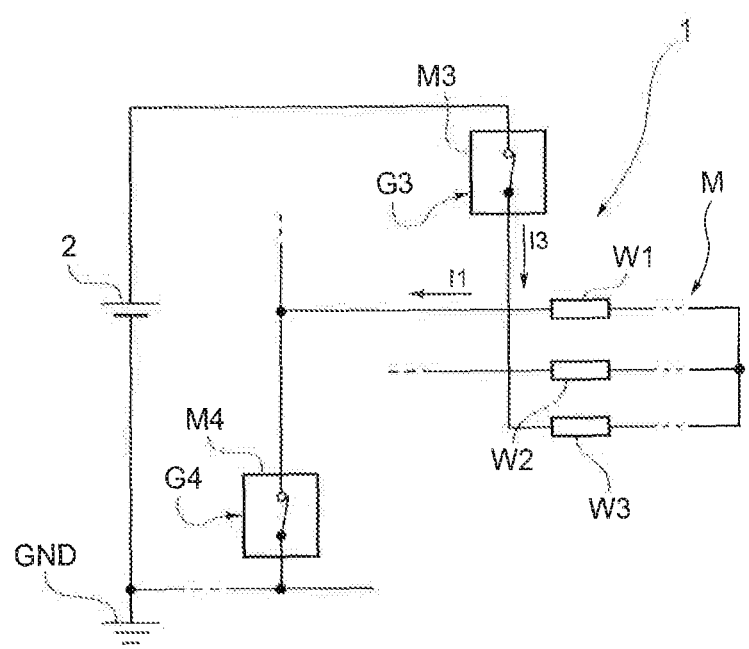

FIGS. 3a to 3c show the operation of the controller of FIG. 1 in the intervals indicated by a, b and c in FIG. 2, corresponding to the variations of the drive signals G1-G6 included in the rectangle of broken lines indicated by K in this figure.

In the interval a, the switch M2 is driven with the signal G2, with pulses having a modulated width (duration) at a (slightly) decreasing average value, while the switch M4 is driven with the signal G4 in continuous conduction.

Correspondingly, as shown in FIG. 3a, currents indicated by I1 and I2 in this figure flow in the windings or phases W1 and W2, respectively, of the motor M. The corresponding variations of these currents I1 and I2 are shown in the left-hand part of FIG. 4, as a function of the position in electrical degrees shown on the horizontal axis.

In the next interval b, the switches M2 and M3 are driven with pulses of modulated width (duration), by means of the signals G2 and G3. Furthermore, the switch M2 is driven with pulses having a substantially decreasing average value, while the switch M3 is driven with pulses having a substantially increasing average value.

At the same time, the switch M4 is driven with the signal G4 in continuous conduction.

Figure 4:
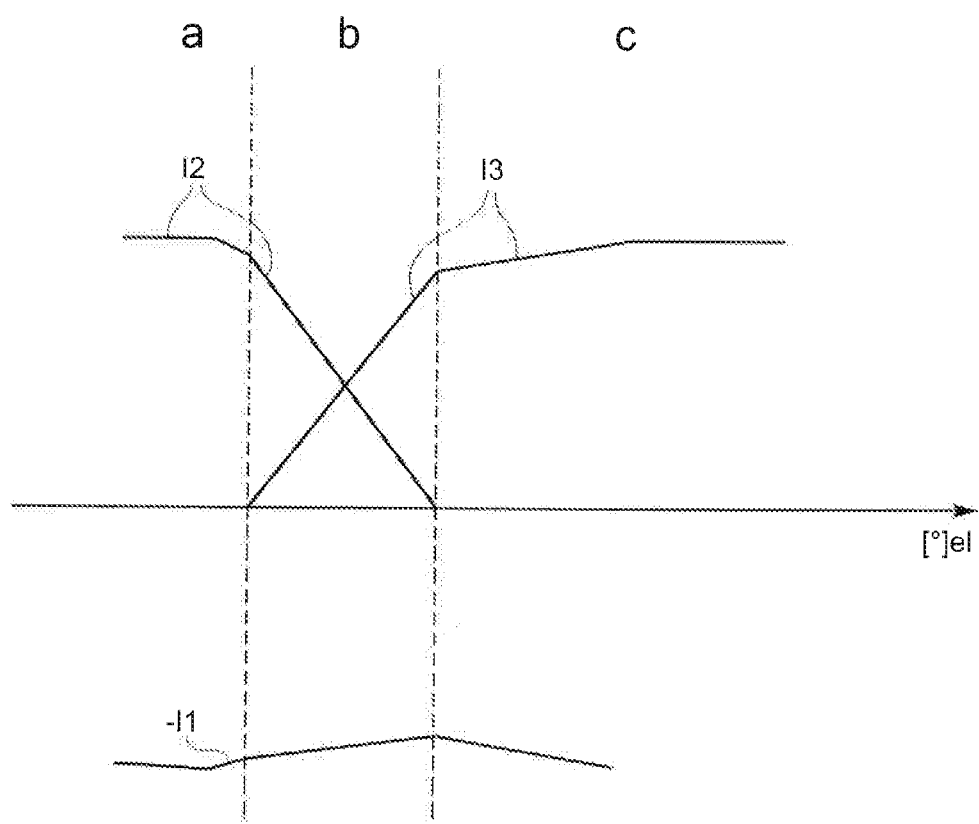
FIG. 4 is a diagram showing modes of variation of the currents in the phases of the motor which can be provided using a controller according to the invention.

Therefore, as shown in FIG. 3b, the currents I1, I2 and I3 flow in the windings or phases W1, W2 and W3, respectively, of the motor M, with the variations shown in a qualitative manner in the middle portion of FIG. 4.

In the next interval c, the switch M3 is driven with the signal G3 with pulses having a width (duration) which is slightly increasing, while the switch M4 continues to be driven in continuous conduction by means of the signal G4. Consequently, as shown in FIG. 3c, the currents I1 and I3 flow in the windings W1 and W3, respectively, of the motor M, the variations of these currents being shown in a qualitative manner in the right-hand portion of FIG. 4.

As will be understood from the preceding description, the controller according to the invention can be used to provide a pseudo-sinusoidal drive in a relatively simple manner, thus substantially reducing the torque ripple and the switching noise.

As mentioned previously, the electronic control unit ECU can be implemented using a simple 8-bit microcontroller, without any need for a more costly DSP.

Clearly, provided that the principle of the invention is retained, the forms of application and the details of embodiment can be varied widely from what has been described and illustrated purely by way of non-limiting example, without thereby departing from the scope of protection of the invention as defined by the attached claims.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. Controller for a three-phase brushless D.C. motor, comprising:
a full bridge circuit, including three circuit branches connected between the two poles of a D.C. voltage supply source, each branch comprising an upper electronic switch and a lower electronic switch, connected with each other and connected to the positive pole and the negative pole, respectively, of said source; each of the windings or phases of the motor being connected to an intermediate point between the two switches of a corresponding branch of the bridge circuit;
and an electronic control unit arranged to drive, in steady state, the upper switches and the lower switches of the bridge circuit by means of respective sets of three drive signals, said sets of three being offset from each other by about 180 electrical degrees, each set comprising three drive signals offset by about 120 electrical degrees from each other and each comprising an active or conducting portion, alternating with an inactive or cut-off portion;
the electronic control unit being arranged in such a way that each active portion of each drive signal includes an initial interval of pulsed activation, an intermediate interval of continuous activation, and a final interval of pulsed activation; the intermediate interval of continuous activation having a duration in electrical degrees which is greater than that of each interval of pulsed activation, wherein the electronic control unit is arranged to drive, in steady state, said switches with drive signals whose active or conducting portion extends over more than 120 electrical degrees, in such a way that each initial interval of pulsed activation of the drive signal of a switch of the full bridge circuit overlaps at least in part the final interval of pulsed activation of the drive signal of the previously activated switch of the full bridge circuit,
wherein each active or conducting portion of each drive signal begins with a predetermined delay with respect to the immediately preceding zero crossing point of the corresponding back-electromotive force,
wherein said delay is variable as a function of the speed of rotation of the motor and the current drawn by the motor, and
wherein the electronic control unit is arranged to drive, in steady state, said switches with drive signals comprising an initial interval of pulsed activation with pulses having a width or duration modulated with an increasing average value, wherein an average value is variable to a predetermined time profile, and having a final interval of pulsed activation with pulses having a width or duration which is modulated with a decreasing average value.

2. The controller of claim 1, wherein the electronic control unit is arranged to drive, in steady state, said switches with drive signals whose active or conducting portion extends over approximately 140 electrical degrees at least.

3. The controller of claim 1, wherein the electronic control unit is arranged to drive, in steady state, the switches with drive signals whose active or conducting portion is variable as a function of the speed of the motor and/or the current drawn thereby, in such a way that the torque ripple is reduced.

4. The controller of claim 1, wherein the width or duration of the pulses of the initial interval and the final interval varies in accordance with said predetermined time profile, in such a way that the torque ripple is reduced.

5. The controller of claim 4, wherein the width or duration of the pulses of the initial interval and the final interval varies as a function of the speed of the motor and/or the current drawn by the motor.

6. The controller of claim 1, wherein the electronic control unit is formed by an 8-bit microcontroller.

7. The controller of claim 1, wherein the electronic control unit is formed by an 8-bit microcontroller.

\* \* \* \* \*